(No Model.)
J. R. WILKINSON.
Shaft Supporter for Vehicles.
No. 232,881. Patented Oct. 5, 1880.
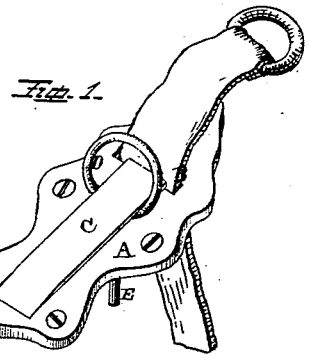
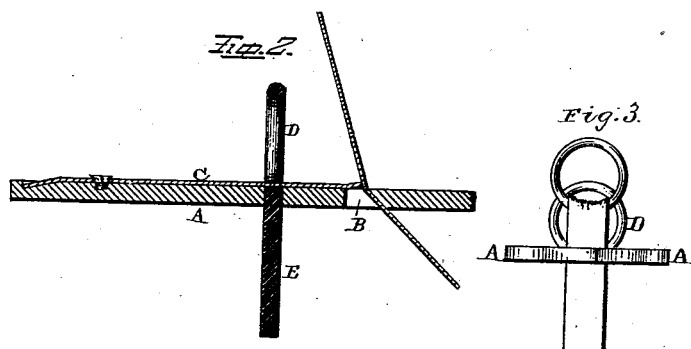
Witnesses:
Wm. W. Mortimer
Chas. H. Isham
Inventor:
Jno. R. Wilkinson,
per
F. A. Lehmann,
Atty.

UNITED STATES PATENT OFFICE.

JOHN R. WILKINSON, OF NEWNAN, GEORGIA.

SHAFT-SUPPORTER FOR VEHICLES.

SPECIFICATION forming part of Letters Patent No. 232,881, dated October 5, 1880.

Application filed August 20, 1880. (No model.)

*To all whom it may concern:*

Be it known that I, JOHN R. WILKINSON, of Newnan, in the county of Coweta and State of Georgia, have invented certain new and useful Improvements in Shaft-Supporters for Vehicles; and I do hereby declare the following to be a full, clear, and exact description of the invention, such as will enable others skilled in the art to which it pertains to make and use it, reference being had to the accompanying drawings, which form part of this specification.

My invention relates to an improvement in shaft-supporters for buggies, and is intended to be used in connection with an apparatus for detaching runaway horses; and it consists in a suitable plate having an opening through it for a strap to pass through, which strap detaches the runaway horse and supports the shafts, and a spring which allows the strap to be freely drawn through the plate, but will not allow the strap to be drawn back again, whereby the front ends of the shafts are supported above the ground, as will be more fully described hereinafter.

The object of my invention is to provide an attachment for vehicles by means of which, after the runaway horse has been detached, the front ends of the shafts will be prevented from dropping upon the ground, and thus avoid the danger of their being caught in the horse's legs or of being broken by striking against some obstruction, and that without the trouble of the driver holding the shafts supported by means of his hands.

Figure 1 is a perspective of my invention. Fig. 2 is a vertical section of the same. Fig. 3 shows my invention in connection with one of the many forms of horse-detaching devices that have been patented.

There have been many contrivances invented for detaching runaway horses; but one great trouble with such devices has been that after the runaway horse was detached the front ends of the shafts would drop upon the ground, either becoming entangled in the horse's legs, or else strike against some projection and be broken, or the sudden stoppage of the vehicle would cause the person to be thrown out and severely injured.

A represents a flat plate, of any desired shape or size, and which has an opening, B, made through its front end. This opening is tapered from the bottom backward toward the top of the front side of the opening, and the rear side is made perpendicular, as shown. Through this opening is passed the upper end of the strap or thong which is connected to the detaching apparatus, by means of which the runaway horse is released from the vehicle. This plate is secured to the wood-work of the front of the buggy, just under the dashboard, by means of suitable screws, so that its front end will project far enough over the front end of the body to allow the supporting and detaching strap to pass through the opening without being interfered with. Secured to the top of this plate is a flat spring, C, which is held in position either by being recessed in the top of the plate or in any other suitable manner, and which has its front end turned upward and made to project a suitable distance over the top of the opening B. The space left between the front end of this spring and the inclined side of the opening B is just sufficient to allow the detaching and supporting strap to pass freely up through the opening by pulling the front end of the spring slightly upward in its movement, but not sufficient to allow the strap to be drawn back downward through the opening without the front end of the spring catching in its rear side. In order to operate this spring so that the strap can be instantly released from the spring, the ring D, having the long guiding portion E, is passed through the plate, and the front end of the spring passes through the ring, so that when the ring is drawn upward the front end of the spring is drawn away from the hole, so as to allow the strap to slip freely downward. The guiding portion E of the ring fits in a suitable hole which is bored in the front edge of the body of the buggy, and thus keeps the ring always in position, so that it will readily operate the spring without the danger of becoming displaced.

The operation of my invention is as follows: The strap which is connected to the detaching apparatus, and which is intended to support the shafts after the horse has been released, has its upper end passed up through the opening B in the plate A, inside of the buggy, where the driver can instantly catch hold of it. As soon as the horse begins to run away, by catching hold of the upper end of this strap and pulling it upward the horse will be detached, and the spring C will instantly catch in the rear side of the strap in such a manner as to prevent the weight of the shafts from pulling it backward. As the strap cannot be pulled back through the plate on account of this spring, the shafts are held supported in either a horizontal or an inclined position, so that their front ends will not come in contact with the earth nor drop low enough to become entangled with the horse's legs or to strike against any projection on the ground, which would either cause the shafts to be broken or the sudden stoppage of the vehicle to throw the occupants out. As soon as it is desired to release the spring it is only necessary to pull up on the ring or push from the back, when the front end of the spring will release the strap, so that it can be drawn freely downward.

Having thus described my invention, I claim—

The combination of the plate A, having the opening B for the strap to pass through, the spring C, and a ring or other device for raising the spring upward, substantially as described.

In testimony that I claim the foregoing I have hereunto set my hand this 18th day of August, 1880.

JOHN R. WILKINSON.

Witnesses:
J. E. BARRETT,
T. J. HOLLIS.